United States Patent [19]

Lancaster

[11] 4,270,601

[45] Jun. 2, 1981

[54] HEATER FOR PRE-HEATING FUEL WITH A HEATED LIQUID

[75] Inventor: Arthur Lancaster, Lafayette Hill, Pa.

[73] Assignee: The Budd Company, Troy, Mich.

[21] Appl. No.: 110,329

[22] Filed: Jan. 7, 1980

[51] Int. Cl.³ .................. F28D 7/10; F02M 31/00
[52] U.S. Cl. .................................. 165/154; 123/557
[58] Field of Search ............ 123/122 E, 546, 557; 165/154, 156

[56] References Cited

U.S. PATENT DOCUMENTS

| | | | |
|---|---|---|---|
| 1,300,600 | 4/1919 | Giesler | 123/122 E |
| 2,059,992 | 11/1936 | Gould | 165/154 |
| 2,152,280 | 3/1939 | Rapuano | 165/156 |
| 3,001,767 | 9/1961 | Straubing | 165/154 |
| 4,208,996 | 6/1980 | Lancaster | 165/51 X |
| 4,218,999 | 8/1980 | Shearer | 165/156 X |

FOREIGN PATENT DOCUMENTS

| | | | |
|---|---|---|---|
| 1111654 | 7/1961 | Fed. Rep. of Germany | 165/156 |
| 333947 | 6/1936 | Italy | 165/154 |
| 51607 | 4/1910 | Switzerland | 165/154 |
| 684602 | 12/1952 | United Kingdom | 165/154 |

Primary Examiner—Sheldon J. Richter
Attorney, Agent, or Firm—A. L. Trueax, Jr.

[57] ABSTRACT

A pre-heater for fuel includes a corrugated tubing for passing hot water therethrough. An outer cylinder forms a jacket around said corrugated tubing to form a chamber to receive therethrough the fuel to be heated. The heat from the hot water is transmitted through the corrugated tubing to heat the fuel.

3 Claims, 3 Drawing Figures

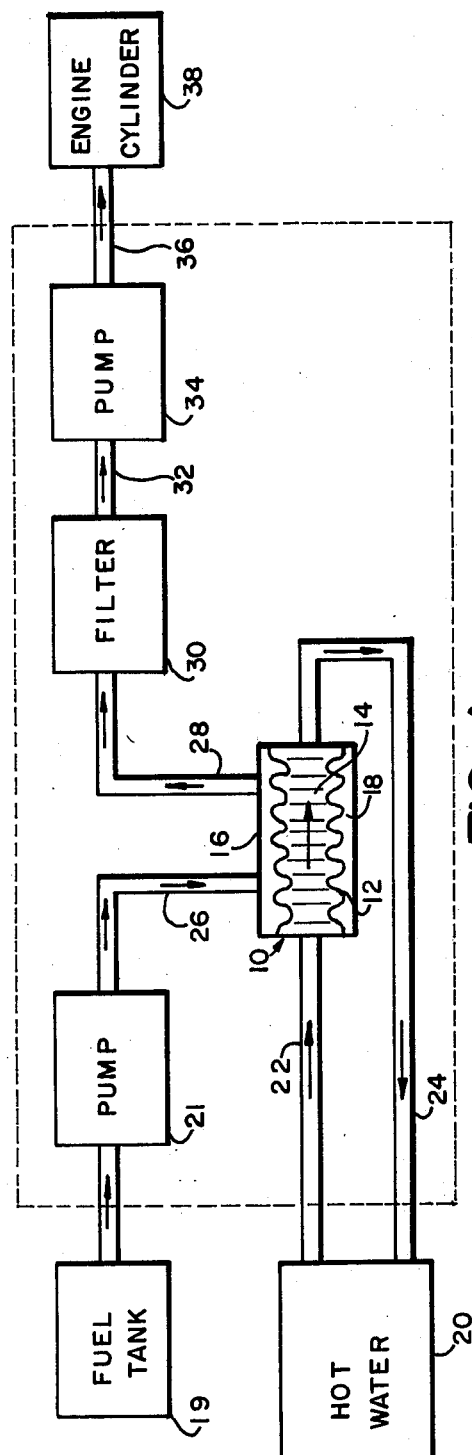
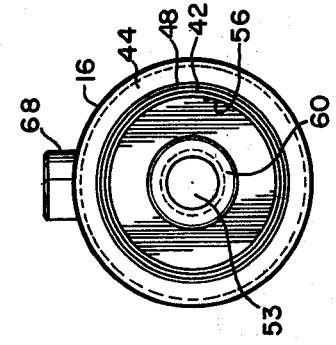
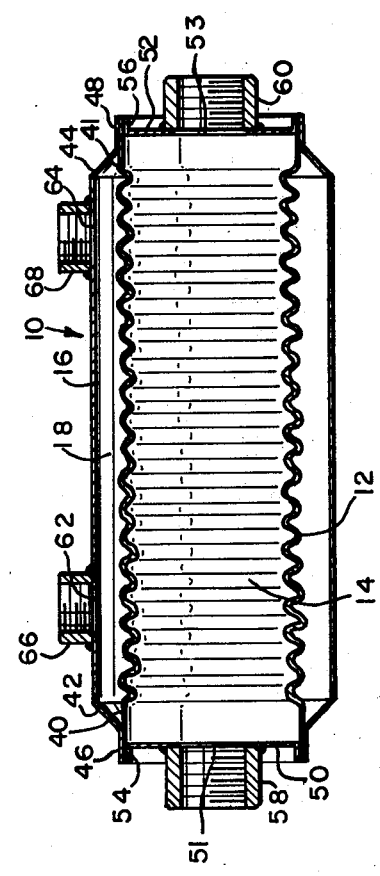

HEATER FOR PRE-HEATING FUEL WITH A HEATED LIQUID

BACKGROUND OF THE INVENTION

1. Field of the Invention

Temperatures below zero cause problems in the operation of diesel engines because they tend to cause wax formations in the fuel for the engine. The flaky wax formations tend to clog the filters in the fuel flow system and prevent proper operation of the engine. To overcome this problem, it is necessary to preheat the fuel before it is applied to the engine in order to avoid clogging of the filter system.

2. Prior Art

Previous pre-heaters have used hot water in the radiator of the vehicle. In one such heater, the fuel line was passed through an outer larger conduit which jacketed the inner conduit. The hot water in the outer conduit heated the fuel in the fuel line as it passed therethrough. In these heaters, the fuel remained in its original line, which was relatively small in diameter and therefore did not become adequately heated.

In a copending application of the same inventor and assigned to the same assignee as the present invention entitled "A Heater for Pre-Heating Fuel", Ser. No. 967,523, filed Dec. 7, 1978, now U.S. Pat. No. 4,208,996 there is described another type of pre-heater which is generally cubical in shape and divided into two separate chambers, with heated water in one chamber and the fuel in the other. This provided a greater area for the fuel to be heated.

While the pre-heater described in the aforementioned application offered advantages over the prior art, it was found that by changing the physical structure of the pre-heater from substantially rectangular enclosures to cylindrical enclosures and providing a special type of heat transmitting member between the water and the fuel that a more commercially acceptable heater of higher efficiency could be made.

OBJECTS OF THE INVENTION

It is an object of this invention to provide an improved heater for pre-heating fuel with a heating fluid which provides a maximum heat transfer from the fluid to the fuel.

It is a further object of this invention to provide an improved heater for pre-heating fuel with a heating fluid in which maximum heating of the fuel is obtained in a minimum space.

It is still a further object of this invention to provide an improved heater for pre-heating fuel with a heating fluid in which the capacity of the heater may be increased or decreased without extensive retooling.

BRIEF SUMMARY OF THE INVENTION

In accordance with the present invention a pre-heater for heating fuel includes a corrugated tubing for passing heated water therethrough. An outer cylinder forms a jacket around the corrugated tubing to form a chamber to pass the fuel therethrough. Heat from the water is transmitted through the corrugations of the tubing to heat the fuel. The corrugations provide a maximum heat transfer area between the water and the fuel.

Other objects and advantages of the present invention will be apparent and suggest themselves to those skilled in the art, from a reading of the following specification and claims, taken in conjunction with the accompanying drawings, in which:

BRIEF DESCRIPTION OF THE DRAWINGS

FIG. 1 is a block diagram illustrating a pre-heating system for fuel of the type involving the present invention;

FIG. 2 is a cross-sectional side view of a pre-heater device used in the system illustrated in FIG. 1, and FIG. 3 is an end view of the pre-heater device illustrated in FIG. 2.

DESCRIPTION OF THE INVENTION

Referring to FIG. 1, a pre-heater 10 comprises a corrugated tubing 12 forming a passageway 14. A cylindrical member 16 surrounds and forms a jacket for the corrugated tubing 12 to provide a chamber 18 between the inner surface of the member 16 and the outer surface of the tubing 12.

A diesel engine system of a vehicle which may use the present invention, generally includes a radiator. Hot water is circulated by a pump from a radiator or other source 20 through an inlet conduit 22 through the passageway 14 in the corrugated tubing 12 and back to the source 20 through a conduit 24.

During subzero weather when wax tends to build up in the liquid fuel and therefore requires pre-heating, the fuel is fed from a fuel tank 19 to a lift pump 21. The pump 21 forces the fuel through an inlet conduit 26 into the chamber 18. The corrugated tubing 12 is highly conductive of heat to permit the heat from the hot water to be transmitted into the chamber 18.

The corrugated tubing 12 provides a maximum area for heat transmission. Greater heat transmission is achieved not only because of the corrugations, but because the circular tubing provides a greater area of contact for the fuel to be heated as opposed to a flat heat transmission member. The increased heating efficiency resulting from the corrugations and circular shape makes it possible to provide the same amount of pre-heating in smaller units than when cubical or rectangular type enclosures are used.

The fuel in the chamber 18 passes through an outlet conduit 28 to a filter 30. This is the filter that tends to clog if wax forms in the fuel. When the fuel is heated sufficiently, the tendency of wax building up in the fuel is minimized and the filter 30 will not tend to clog.

After passing the filter 30, the heated fuel is passed through a conduit 32, through an injection pump 34, through a conduit 36 and finally into the engine cylinders 38. Except for the preheater 10, and connections thereto, all the blocks mentioned are conventional, found in many diesel engine systems and therefore not described in detail.

Referring to FIGS. 2 and 3, the corrugated tubing 12 is centrally disposed within the cylindrical member 16 to form the chamber 18 completely around its circumference. The member and 16 and corrugated tubing 12 may be readily made into different lengths, i.e., made longer or shorter, to accomodate different capacities for heating. Making these members longer or shorter does not require extensive modification of the dies for making them. The parts preferably are made of stainless steel.

The ends 40 and 41 of the corrugated tubing 12 comprise circular flat surfaces to permit welding connections to the other elements of the heater 10. The main surface of the cylindrical member 16 include inwardly extending angular portions 42 and 44 terminating at circular end sections 46 and 48, respectively. The inner surface of the sections 46 and 48 are dimensioned to engage the outer surface of the end portions 40 and 41, respectively, of the corrugated tubing 12.

Circular end closures 50 and 52, including central openings 51 and 53 therein, include outwardwardly projecting circular perpendicular sections 54 and 56 respectively. The end closures 50 and 52 are dimensioned to fit into the end openings of the corrugated tubing 12 so that the outer surfaces of the perpendicular sections 54 and 56 engage the inner surfaces of the ends 40 and 42 respectively, of the tubing 12. The end sections 46, 48, the ends 40, 41 and the sections 54, 56 overlap each other so that the respective groups of three surfaces may be readily welded together. The advantage of this is that if any one of the weld joints breaks to cause either the hot water or fuel to leak, it will leak to the outside of the housing of the pre-heater 10. Thus, there is no liklihood of damage to the engine as a result of water mixing with the fuel.

Connectors 58 and 60 are welded to the end closures 50 and 52 respectively. These connectors are aligned with the central openings 51 and 53 in the end closures and are adapted to receive the conduits 22 and 24, respectively (FIG. 1). The outer cylinder 16 include openings 62 and 64. Connectors 66 and 68 are welded to the cylinder 16 in alignment with the openings 62 and 64. The connectors 58 and 60 are disposed to receive the conduits 26 and 28, respectively.

In the preheater illustrated, the cylinder 16 forming the chamber 18 with the tubing 12, has its outside surface exposed to ambient temperature. When the temperature of the fuel rises to the temperature of the hot water, the fuel transmits heat through the cylinder 16. At about 150° F., for example, the temperature of the fuel will stop rising. The limit in fuel temperature rise prevents the engine from losing horsepower during operation. Therefore, there is no need for an operator to operate shutoff valve when he drives from areas of high temperature to areas of low temperature.

The pre-heater of the present invention has all the advantages of the heater described in the aforementioned application. In addition, it has the added advantage that for equal efficiency, it may be made smaller. This is because the circular corrugated tubing provides the same area of heat transmission in a smaller space. Also, the pre-heater of the present invention may be built for different capacities without greatly modifying the tooling involved. Finally, in most cases, it is generally easier to connect the hot water in an aligned centrally disposed passageway. With respect to the fuel, it has to go from relatively thin fuel lines into a large chamber for maximum heating and therefore the irregular path of the fuel is less important.

What is claimed is:

1. A pre-heater for heating fuel with a heated liquid comprising:
   a. a corrugated tubing forming a first chamber to receive said heated liquid therethrough;
   b. an outer cylinder forming a jacket around said corrugated tubing and connected towards the ends of said corrugated tubing to form a second chamber to receive said fuel therethrough:
   c. inlet and outlet means connected to said corrugated tubing to pass said heated liquid therethrough.
   d. second inlet and outlet means connected to said second chamber to pass said fuel therethrough:
   e. said corrugated tubing and said cylindrical member each include flat circular overlapping extensions at the ends thereof secured together and extending to the outside of the pre-heater and away from the fuel in said chamber and the heating liquid in said corrugated tubing; and
   f. enclosures having flat circular portions extending in the same directions as said overlapping extensions and secured within the extensions at the ends of said corrugated tubing, said enclosures having centrally disposed openings leading to said inlet and outlet means for passing said heated liquid therethrough;
   whereby heat from said heating liquid is transmitted through said corrugated tubing to heat said fuel in said chamber.

2. A pre-heater as set forth in claim 1 wherein openings are provided in said cylindrical member leading to said second inlet and outlet means for said fuel.

3. A pre-heater as set forth in claim 2 wherein the extensions of said corrugated tubing, the extensions of said cylindrical member and the circular portions of said closures are welded together and overlap each other, whereby the breaking of any one weld joint will cause one or the other of said fuel or said heated liquid to leak to the outside of said pre-heater without any mixing the fuel with the heated liquid.

* * * * *